UNITED STATES PATENT OFFICE.

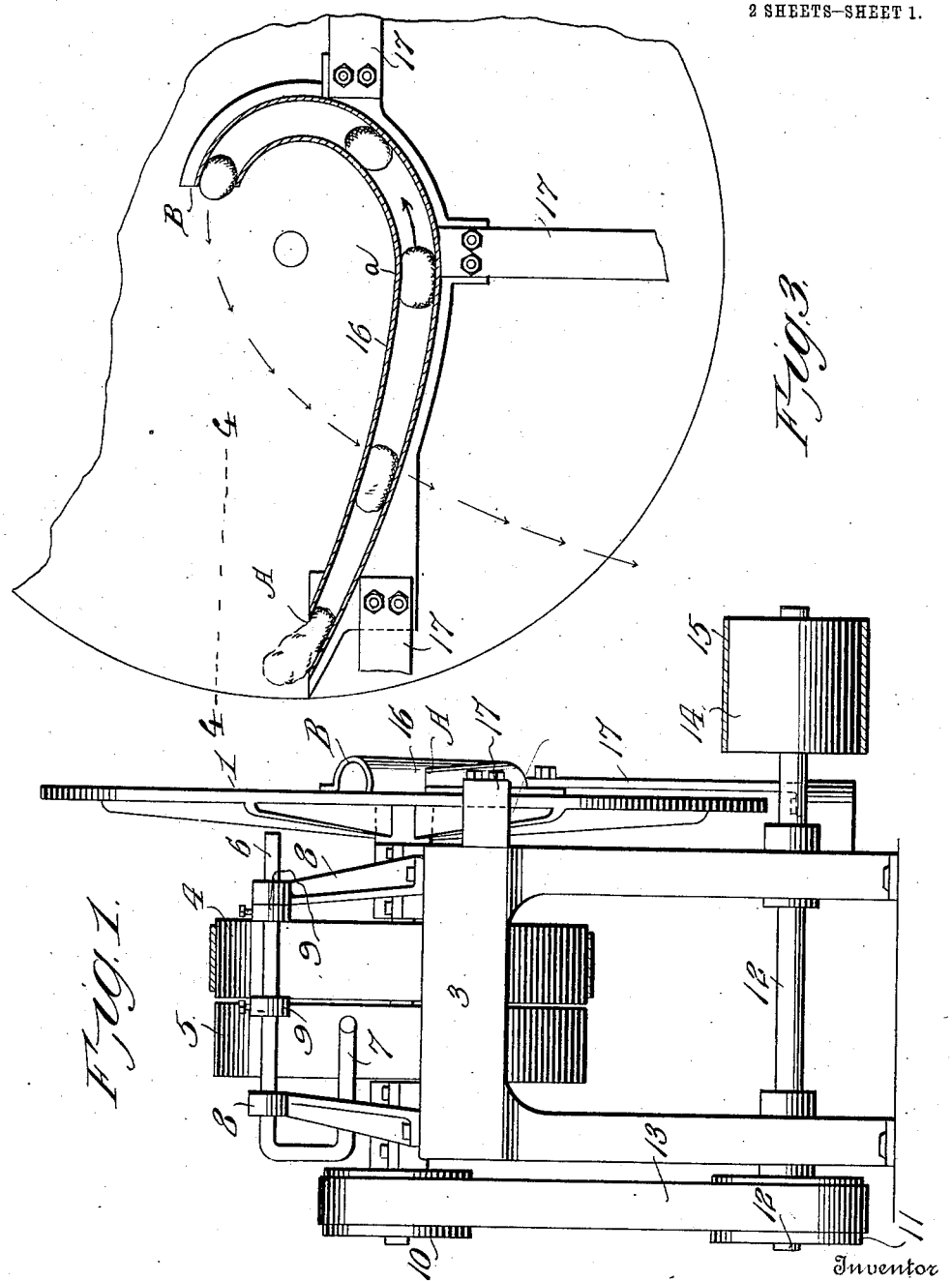

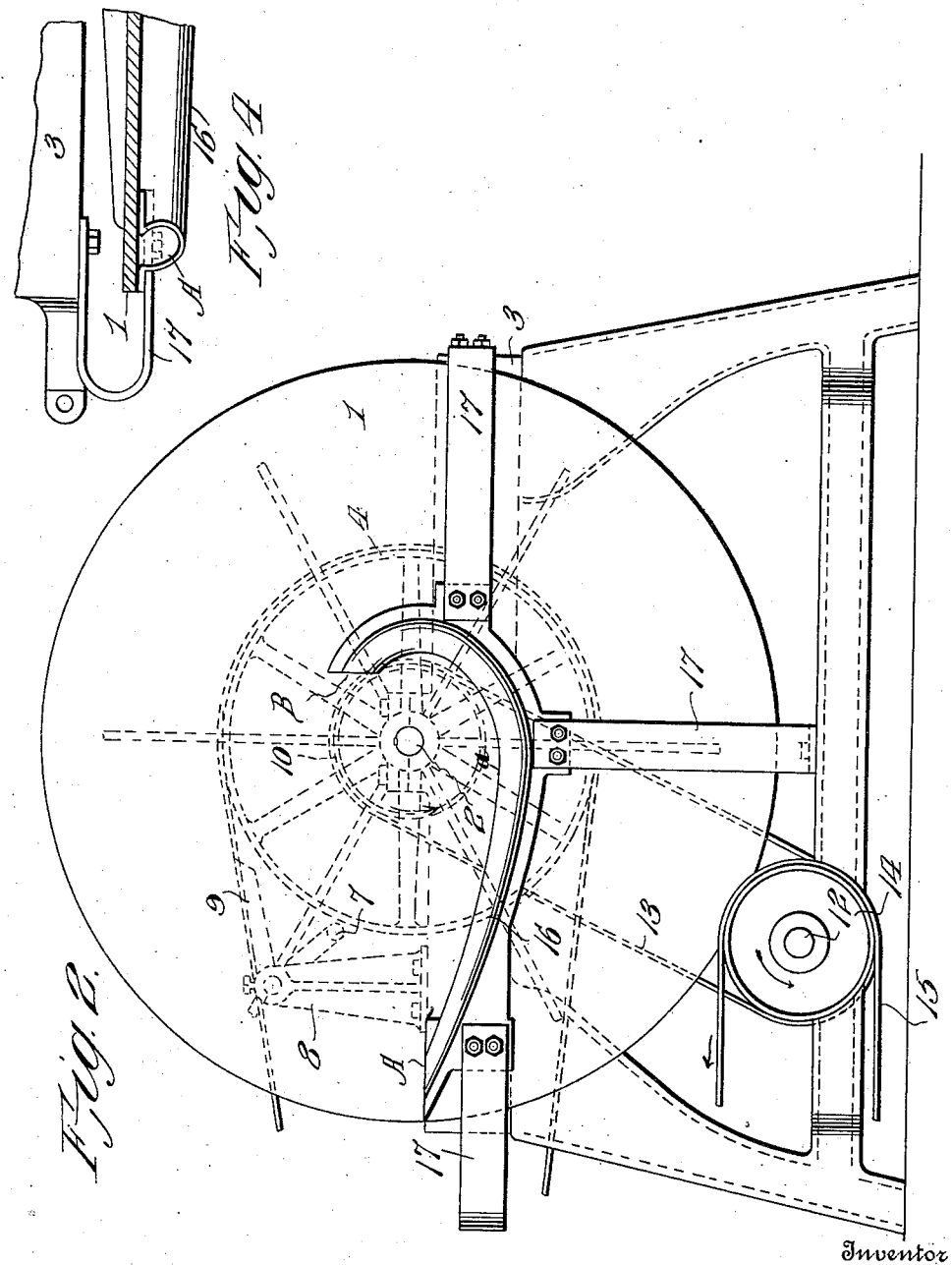

ROY A. WITHERILL, OF BIRMINGHAM, ALABAMA.

FORMING-MACHINE.

1,041,550. Specification of Letters Patent. Patented Oct. 15, 1912.

Application filed August 30, 1910. Serial No. 579,673.

*To all whom it may concern:*

Be it known that I, ROY A. WITHERILL, a citizen of the United States of America, residing at Birmingham, in the county of Jefferson and State of Alabama, have invented new and useful Improvements in Forming-Machines, of which the following is a specification.

This invention relates to forming machines and particularly to a machine designed for working dough or other plastic substance, the object of the invention being to provide a machine of this character in which a vertically disposed disk-like revolving carrier is employed and arranged with respect to the molding trough or gutter so that the dough in its tendency to fall by gravity in the gutter will be engaged by the carrier to the extent that considerable resistance in the movement of the dough will be offered, the construction of the gutter being such that after the dough has been moved to the lowest point therein it will be formed into a substantially perfect ball-like mass.

A further object of the invention is to provide a forming machine of this character in which the air spaces or bubbles usually found in the dough, due to the incomplete working of the same, are obviated; the machine for this purpose embodying means whereby the dough is worked in two directions.

A still further object of the invention is to provide a conveyer which is arranged with respect to the said disk-like carrier and with the molding or forming trough or gutter so that when the balls of dough have been ejected they will fall by gravity onto the conveyer, thus obviating having to handle the dough before it is placed into the oven.

In the drawings, forming a portion of this specification and in which like numerals of reference indicate similar parts in the several views:—Figure 1 is an end view of my improved forming machine. Fig. 2 is a side view thereof. Fig. 3 is a detail side elevation of a portion of a carrier and the molding trough. Fig. 4 is a sectional plan view taken on the line 4—4 of Fig. 3.

The machine consists essentially of a vertically disposed disk-like carrier 1 whose outer surface is perfectly smooth so as to prevent the dough or plastic material from adhering thereto and from becoming hardened thereon. This carrier is fixed to a driven shaft 2 which is mounted in suitable bearings on the top of a supporting frame or table 3. A driving pulley 4 is fixed to the shaft and it may be belted in any suitable well known manner to a motor of the desired type. Adjacent to the fixed pulley and on the shaft 2 is a loose pulley 5 onto which the belt can be shifted. The shifter for the belt comprises a member having the guide portions 6 and 7 slidably supported in the bearings 8 on the table. The portion 6 of the shifter is provided with spaced shifting elements 9 which straddle the belt so that on sliding movement of the shifter the operator can conveniently move the belt to the fixed or to the loose pulley as the occasion demands.

The driven shaft 2 of the carrier has secured thereto a pulley 10 which is belted to the pulley 11 on the countershaft 12 by the belt 13. This counter shaft is mounted in suitable bearings on the table 3, and as illustrated, one end of the shaft is located beneath the disk and it carries at one side thereof a pulley 14 over which a conveyer belt 15 extends.

A forming trough or gutter 16 is located at one side of the disk-like carrier and the concavity of such trough is arranged in direct opposing relation to the outer flat surface of the carrier. The trough is of a tapered construction throughout and it may be described that it is arranged substantially spirally about the axis of the carrier and at an angle to the line of rotation of the carrier. As described, the forming trough is tapered throughout and substantially spirally disposed with respect to the axis of the carrier, however, specifically the former is of a gradually decreasing diameter outwardly from its point of discharge, the feed end of the former being the smallest part. The portion of the former from A to the point *a* is inclined relative to the radius of the carrier so that the effective spinning of the material will occur between the two last named points. In view of the fact that the former from A to *a* extends downwardly and at an inclination with respect to the axis of the carrier, the material can be fed with considerable rapidity, at the same time avoiding congestion of the material and thereby preventing one mass of material from running into another. This is due solely to the construction of the former of a gradually decreasing diameter outwardly in the direction of the intake end of the former. The gutter is detachably secured to the table 3 by bracket members 17.

A represents the intake of the gutter and B the exit or outlet thereof. From A the gutter extends downwardly to a point approximately beneath the axis of the carrier and from this point the gutter extends upwardly so that B is slightly above the axis of the carrier. The gutter as described, is tapered throughout, the smallest part thereof being at A and it increases gradually toward B so that on feeding the dough or plastic material it will fill the gutter sufficiently so that the disk or working surface thereof will act thereon to work the material and to form the same in a substantially perfect mass before it reaches a position near the lowest end of such gutter.

In briefly describing the operation of my improved dough former, the dough is fed to the gutter at A, and it is obvious that the pieces on insertion in the gutter will tend to fall by gravity to the lowest point. In view of the tapered construction of the gutter the material will tend to resist the movement of the carrier but it will be fed therein to the extent that when the material reaches the lowest point of the carrier the mass of dough will be almost perfectly formed. In view of the increased area of the gutter from the point beneath the axis of the carrier to the exit B the action of the carrier against the material will tend to spin the same so that when it is ejected at B it will be of ball-like formation. The location of the conveyer belt with respect to the carrier and with respect to the exit B of the forming gutter is such that after the dough has been ejected it will fall a considerable distance before it is finally deposited on such conveyer. This action alone in a machine of this character is considerable toward assisting in perfectly forming the material in ball-form. By discharging the material directly onto the conveyer the hands of the operator need not unnecessarily be brought into direct contact therewith and the material may be discharged into the baking pans or grates, as is obvious. It may be stated that, incident to the peculiar construction of the forming gutter, it is adapted for use in forming plastic material into masses of various sizes. This of course depends upon the size of the material inserted in the forming gutter, but incident to the tapered construction of the gutter, materials of various sizes will be acted upon in an efficient manner.

From the construction of the brackets 17 described herein, it may be stated that they are arranged to accommodate forming gutters of different sizes. These gutters may be quickly associated with the brackets so that a very great range in size in the masses of material to be acted upon may be obtained.

I claim:—

1. In a machine for molding plastic materials, a rotatably mounted carrier embodying a vertically disposed disk, a former disposed at one side of the disk and opening at one side directly onto the disk, the said former being of a gradually decreasing diameter from its point of material discharge to its point of material introduction and having its discharge end disposed above the axis of the carrier, and a conveyer located below the plane of the former and forwardly of the discharge end of the said former.

2. In a machine for molding plastic materials, a vertically disposed rotatably mounted carrier, a former disposed at one side of the carrier and opening at one side directly onto the same, the said former being of a gradually decreasing diameter from its point of material discharge to its point of material introduction, the major portion of said former being arranged below and angularly with respect to the axis of the carrier, the minor portion of said former being arranged substantially concentric with respect to the axis of the carrier, and the said former having its discharge end arranged in a plane above the axis of the carrier, substantially as, and for the purpose, described.

3. In a machine for molding plastic materials, a table, a vertically disposed rotatably mounted carrier supported by said table, brackets secured to the table, a former detachably secured to the said table by means of the brackets and disposed at one side of the carrier and opening at one side directly on to the latter, the said former being of a gradual decreasing diameter from its point of material discharge to its point of material introduction, and having its discharge end disposed above the axis of the carrier, and a conveyer located below the plane of the former.

In testimony whereof I affix my signature in presence of two witnesses.

ROY A. WITHERILL.

Witnesses:
S. L. GRAHAM,
G. A. MCALLISTER.

Copies of this patent may be obtained for five cents each, by addressing the "Commissioner of Patents, Washington, D. C."